(12) United States Patent
Tilford et al.

(10) Patent No.: US 7,721,196 B2
(45) Date of Patent: May 18, 2010

(54) ARBITRARY RENDERING OF VISUAL ELEMENTS ON A CODE EDITOR

(75) Inventors: John S. Tilford, Seattle, WA (US); Randy S. Kimmerly, Woodinville, WA (US); Vijaye G. Raji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 11/296,976

(22) Filed: Dec. 7, 2005

(65) Prior Publication Data

US 2007/0130519 A1    Jun. 7, 2007

(51) Int. Cl.
*G06F 17/00* (2006.01)

(52) U.S. Cl. .............. 715/236; 717/129; 717/128; 717/110

(58) Field of Classification Search .......... 715/277, 715/244, 236; 717/129
See application file for complete search history.

(56) References Cited

U.S. PATENT DOCUMENTS

| | | | | |
|---|---|---|---|---|
| 4,723,209 A * | 2/1988 | Hernandez et al. | ........... | 715/210 |
| 4,829,470 A * | 5/1989 | Wang | ........... | 715/234 |
| 5,214,755 A * | 5/1993 | Mason | ........... | 715/209 |
| 5,337,406 A * | 8/1994 | Takakura et al. | ........... | 715/202 |
| 5,467,448 A * | 11/1995 | Hilton et al. | ........... | 715/235 |
| 5,805,170 A * | 9/1998 | Burch | ........... | 345/619 |
| 5,933,139 A | 8/1999 | Feigner et al. | ........... | 345/338 |
| 6,057,858 A * | 5/2000 | Desrosiers | ........... | 345/467 |
| 6,081,816 A * | 6/2000 | Agrawal | ........... | 715/210 |
| 6,233,726 B1 | 5/2001 | Rowman et al. | ........... | 717/2 |
| 6,246,404 B1 | 6/2001 | Feigner et al. | ........... | 345/338 |
| 6,502,233 B1 | 12/2002 | Vaidyanathan et al. | ........... | 717/101 |
| 6,587,128 B2 * | 7/2003 | Kanevsky et al. | ........... | 715/768 |
| 6,589,292 B1 * | 7/2003 | Langford-Wilson | ........... | 715/210 |
| 6,769,095 B1 | 7/2004 | Brassard et al. | ........... | 715/513 |
| 6,857,103 B1 | 2/2005 | Wason | ........... | 715/709 |
| 6,915,484 B1 * | 7/2005 | Ayers et al. | ........... | 715/234 |
| 6,951,301 B2 | 10/2005 | Miaskiewicz, Jr. et al. | ........... | 229/238 |
| 7,315,979 B1 * | 1/2008 | Walker | ........... | 715/234 |

(Continued)

FOREIGN PATENT DOCUMENTS

GB    2 342 733    4/2000

OTHER PUBLICATIONS

Title: Open Perl IDE- User Manaul Version: 0.9.9 Date: 2001 url: <http://open-perl-ide.sourceforge.net/documentation/user-manual/script_debugging.html>.*

(Continued)

*Primary Examiner*—Doug Hutton
*Assistant Examiner*—Mustafa Amin
(74) *Attorney, Agent, or Firm*—Woodcock Washburn LLP

(57) ABSTRACT

Visual elements can be arbitrarily rendered in a code editor. Visual elements can be rendered at any location on a display. Visual elements can include text, images, graphics, video, and/or multi-media. Rendering of visual elements will not obstruct a view of rendered text. Nor will rendering of the visual element obstruct a view of the visual element. Visual elements can be rendered between lines of text and/or in-line with text. If a selected location will obstruct a view or either rendered text or another visual element, the rendered text and/or the other visual element is reconfigured to allow space for rendering the visual element.

20 Claims, 7 Drawing Sheets

U.S. PATENT DOCUMENTS

| | | | | |
|---|---|---|---|---|
| 7,437,678 | B2* | 10/2008 | Awada et al. | 715/784 |
| 7,454,699 | B2* | 11/2008 | Altman et al. | 715/255 |
| 7,511,720 | B2* | 3/2009 | Ayers et al. | 345/629 |
| 2002/0004933 | A1* | 1/2002 | Dzoba et al. | 717/4 |
| 2002/0178434 | A1 | 11/2002 | Fox et al. | 717/106 |
| 2003/0055871 | A1* | 3/2003 | Roses | 709/203 |
| 2003/0105620 | A1* | 6/2003 | Bowen | 703/22 |
| 2003/0149961 | A1* | 8/2003 | Kawai et al. | 717/129 |
| 2003/0217354 | A1* | 11/2003 | Bates et al. | 717/129 |
| 2003/0229857 | A1* | 12/2003 | Sayuda et al. | 715/517 |
| 2004/0250175 | A1 | 12/2004 | Draine et al. | 714/46 |
| 2005/0028137 | A1* | 2/2005 | Evans et al. | 717/110 |
| 2005/0114779 | A1* | 5/2005 | Griesmer | 715/711 |
| 2005/0131672 | A1* | 6/2005 | Dalal et al. | 704/2 |
| 2005/0223363 | A1* | 10/2005 | Black-Ziegelbein et al. | 717/127 |
| 2006/0053410 | A1* | 3/2006 | Charisius et al. | 717/109 |
| 2006/0080639 | A1* | 4/2006 | Bustelo et al. | 717/111 |
| 2006/0242590 | A1* | 10/2006 | Polivy et al. | 715/760 |
| 2007/0006171 | A1* | 1/2007 | Raghunandan et al. | 717/131 |
| 2007/0294644 | A1* | 12/2007 | Yost | 715/856 |

OTHER PUBLICATIONS

Title: Using the Exlipse Platform to debug Java Applications on HP NonStop servers Date: Sep. 2004 url: <http://h20223.www2.hp.com/NonStopComputing/downloads/ECLIPSEJAVAWP.pdf>.*

"Use and Position of CSS Elements", http://tutorials.alsacreations.com/div, 6 pages, 2005.

"Layout, Style Builder Dialog Box", http://msdn.microsoft.com/library/default.asp?url=/library/enus/vsintro7/html/vxurflayoutstylebuilderdialogbox.asp, 2 pages, 2005.

* cited by examiner

ARBITRARY RENDERING OF VISUAL ELEMENTS ON A CODE EDITOR

TECHNICAL FIELD

The technical field generally relates to code editors and more specifically to displaying visual elements in code editors.

BACKGROUND

Typical code editors, such as source code editors and text editors, display visual elements other than text on top of or behind text that is currently being displayed, thus obstructing the view of the text being displayed or of the visual element. Some code editors display visual elements in predetermined margins at the edge of a display screen. To display visual elements, current code editors require prior knowledge about which visual elements are to be displayed. Current code editors also need to know the allowable locations on the display screen for displaying visual elements. Further, current code editors do not provide the ability to arbitrarily place a visual element on a display screen without obstructing text. This lack of flexibility can be cumbersome, tedious, and impede code development.

SUMMARY

Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter. In a code editor in which text is being rendered on a display device, visual elements can be rendered at any arbitrary location on the display device. Rendering of the visual elements will not obstruct a view of the rendered text. Nor will rendering of the visual element obstruct a view of the visual element. Visual elements can be rendered at any selected location on the display device including between lines of text and/or in-line with text. If a selected location will obstruct a view of either rendered text, the visual element, or another visual element, the rendered text and/or the other visual element is reconfigured to allow space for rendering the visual element. Spaces can be provided between text characters to allow rendering of the visual element without obstruction. Space also can be provided between lines of text to allow rendering of the visual element without obstruction. Visual elements can include graphics, images, text characters, video, multi-media, or a combination thereof.

BRIEF DESCRIPTION OF THE DRAWINGS

The foregoing summary, as well as the following detailed description, is better understood when read in conjunction with the appended drawings. For the purpose of illustrating arbitrary rendering of visual elements on a code editor, there is shown in the drawings exemplary constructions thereof; however, arbitrary rendering of visual elements on a code editor is not limited to the specific methods and instrumentalities disclosed. In the drawings.

DETAILED DESCRIPTION OF ILLUSTRATIVE EMBODIMENTS

Figure 1:
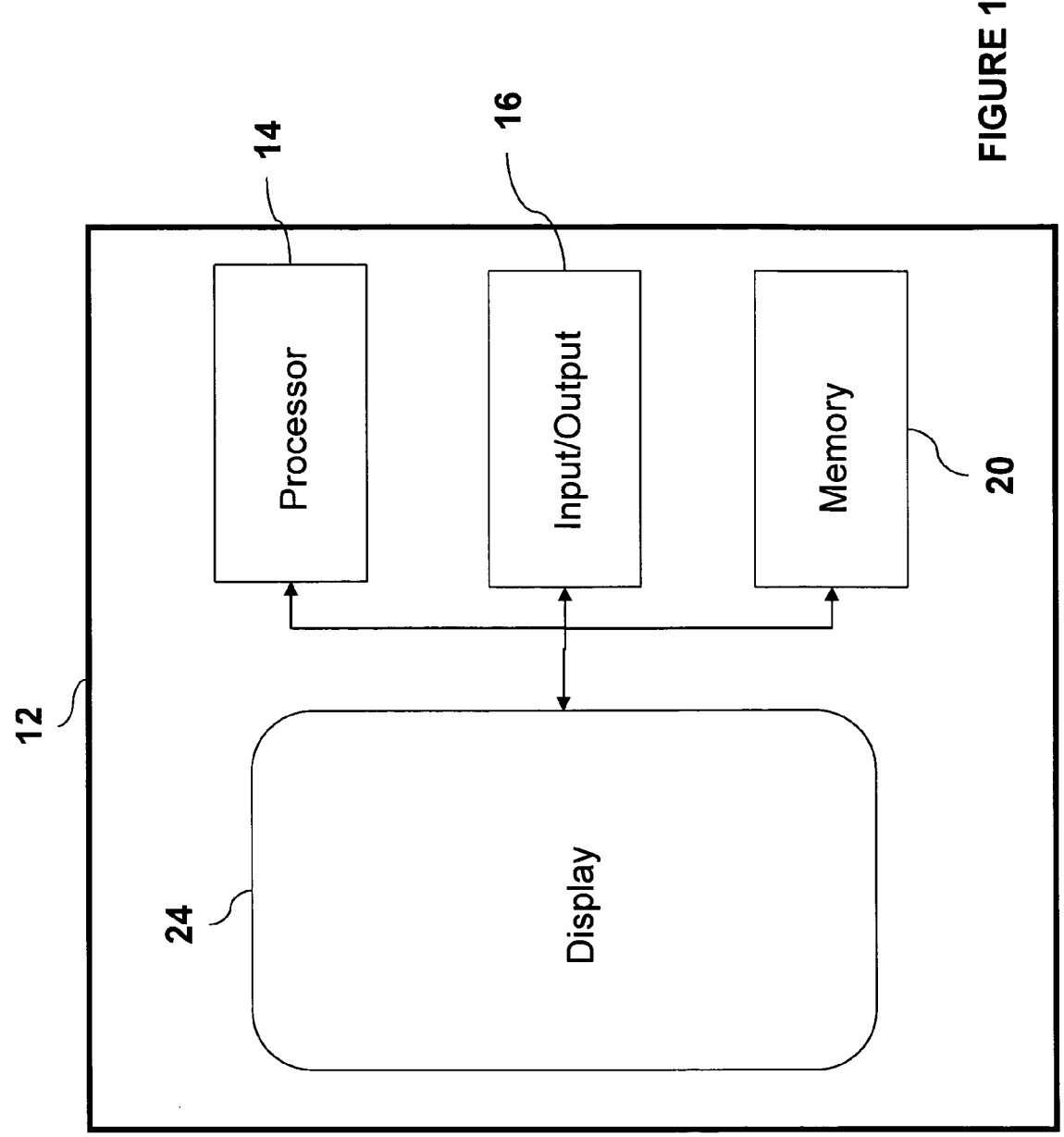
FIG. 1 is a diagram of an exemplary computing device for arbitrarily rendering a visual element in a code editor.

FIG. 1 is a diagram of an exemplary computing device 12 for arbitrarily rendering a visual element in a code editor. The computing device 12 comprises a processor portion 14, an input/output portion 16, a memory portion 20, and a display portion 24. In its most basic configuration, computing device 12 includes at least one processing portion 14, and a memory portion 20. Depending upon the exact configuration and type of computing device, the memory portion 20 can comprise be volatile memory (such as RAM), non-volatile memory (such as ROM, flash memory, or the like) or some combination thereof. Additionally, the memory portion 20 can comprise additional features/functionality. For example, the memory portion 20 can comprise additional storage (removable and/or non-removable) including, but not limited to, magnetic or optical disks or tape. Computer storage media can include volatile and nonvolatile, removable and non-removable media implemented in any method or technology for storage of information such as computer readable instructions, data structures, program modules or other data. Memory portion 20 represents examples of computer storage media. Computer storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 12. Any such computer storage media can be part of the computing device 12.

The computing device 12 also can contain input/output portion 16 that allows the computing device 12 to communicate with other devices. Input/output portion 16 can comprise communication media. Exemplary communication media embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The computing device 12 is capable of executing a code editor, such as a source code editor or a text editor. When a code editor is being executed, text is rendered on the display portion 24. The display portion 24 can comprise any appropriate display device, such as a cathode ray tube (CRT) display device, a plasma display device, a light emitting diode (LED) display device, a liquid crystal display (LCD) device, or a combination thereof. In an exemplary scenario, a user of the code editor wants to visually render an adornment on the display portion 24, somewhere among the text that is currently being rendered. An adornment can comprise any appropriate visual element, such as an image, a glyph, a text character, a video, multi-media, or a combination thereof, for example. For example, the user may want to insert a breakpoint glyph in line with the rendered text indicating a spot in the code where the code editor should suspend execution. The processor portion 14 receives the request and obtains the requested adornment from the memory portion 20. The requested adornment, as any adornment, can be one of a set of adornments provided with the code editor, an adornment downloaded by the user, an adornment created by the user, or a combination thereof. Thus, the user can visually render an arbitrary adornment on the display portion 24.

The processor portion 14 also will receive an indication of a location on the display portion to render the adornment. The processor portion 14 determines if rendering the adornment at the requested location will obstruct the view of the rendered text, obstruct the view of the requested adornment, or obstruct the view of an adornment currently being rendered. This can be accomplished by any appropriate means known in the art, such as analyzing the representation of rendered text/adornments stored in the memory portion 20. If the processor determines that no view will be obstructed, the requested adornment is rendered at the requested location on the display portion 24. If the processor portion 24 determines that the view of either the rendered text or the adornment will be obstructed, the processor reconfigures the rendered text and/or rendered adornment to allow the requested adornment to be rendered without view obstruction. The processor portion 24 then renders the requested adornment at the requested location.

The code editor manages the adornments, the rendering of adornments, and the reconfiguration of text and/or adornments without having any explicit knowledge of the specific types of adornments. The code editor manages the adornment as an object. The adornment can be any appropriate arbitrary adornment.

Figure 2:
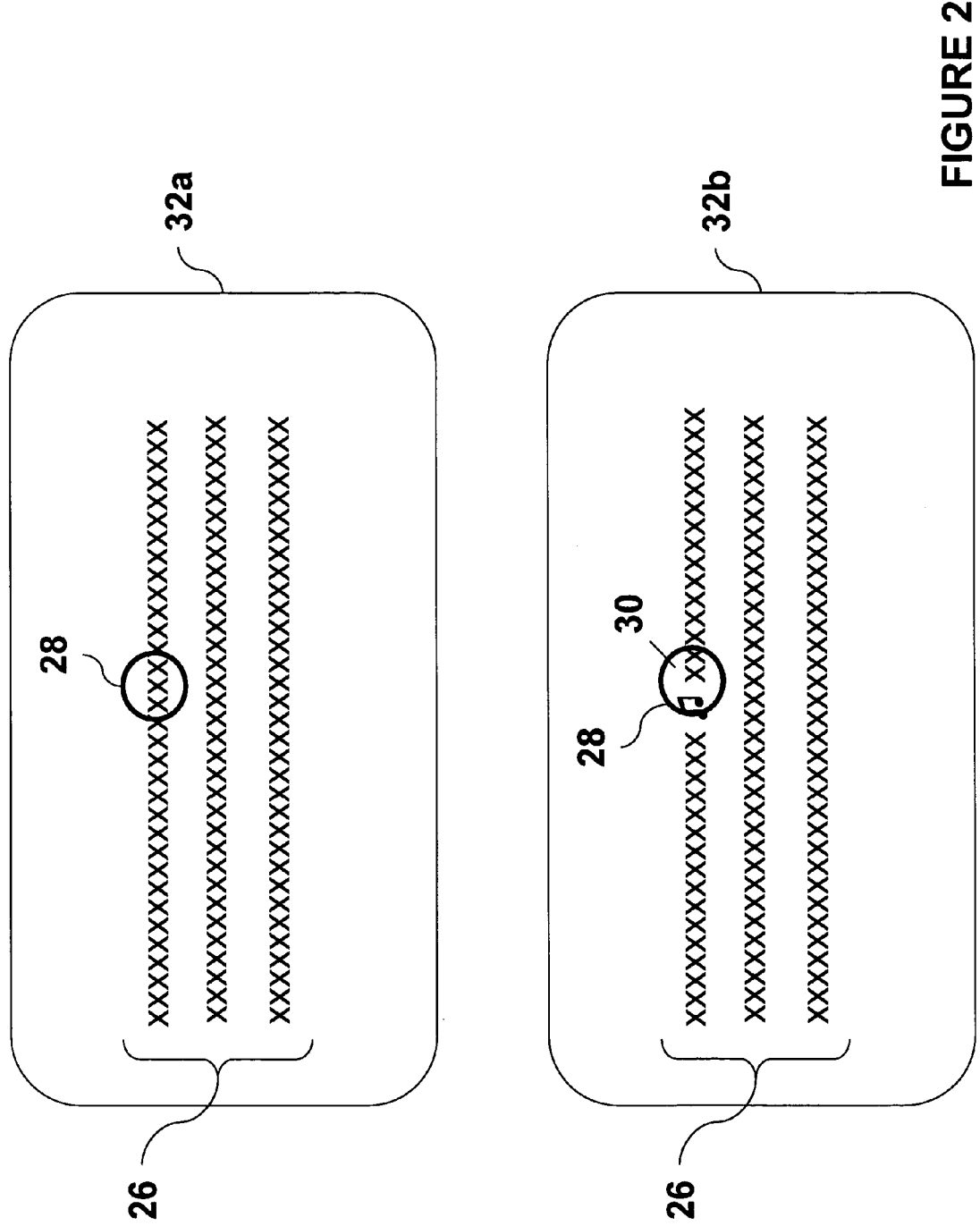
FIG. 2 is an exemplary depiction of rendering a visual element in line with rendered text.

FIG. 2 is an exemplary depiction of rendering a visual element in line with rendered text. The top portion of FIG. 2 is the "before" display, and the bottom portion of FIG. 2 is the "after" display. The display device 32a in the top portion of FIG. 2 depicts rendered text 26 and a requested location 28 for rendering a requested adornment. The display device 32b in the bottom portion of FIG. 2 depicts the rendering of the requested adornment 30 at the location 28. To accomplish this rendering, space is inserted in the rendering of the text at location 28 to allow rendering of the adornment 30. As much space as needed can be inserted. Space is inserted by modifying or reconfiguring the display layout of the display. The text itself is not modified. Thus, text characters in the form of spaces are not inserted into the text, rather the display layout is reconfigured to render the appearance of space being inserted. In an exemplary embodiment, the display layout is modified to give the appearance of a text character in the form of a space, or a number of spaces, being inserted. Thus, the adornment 30 is rendered on the display device 32b without the rendered text 26 being obstructed from view and without the adornment 30 being obstructed from view.

Figure 3:
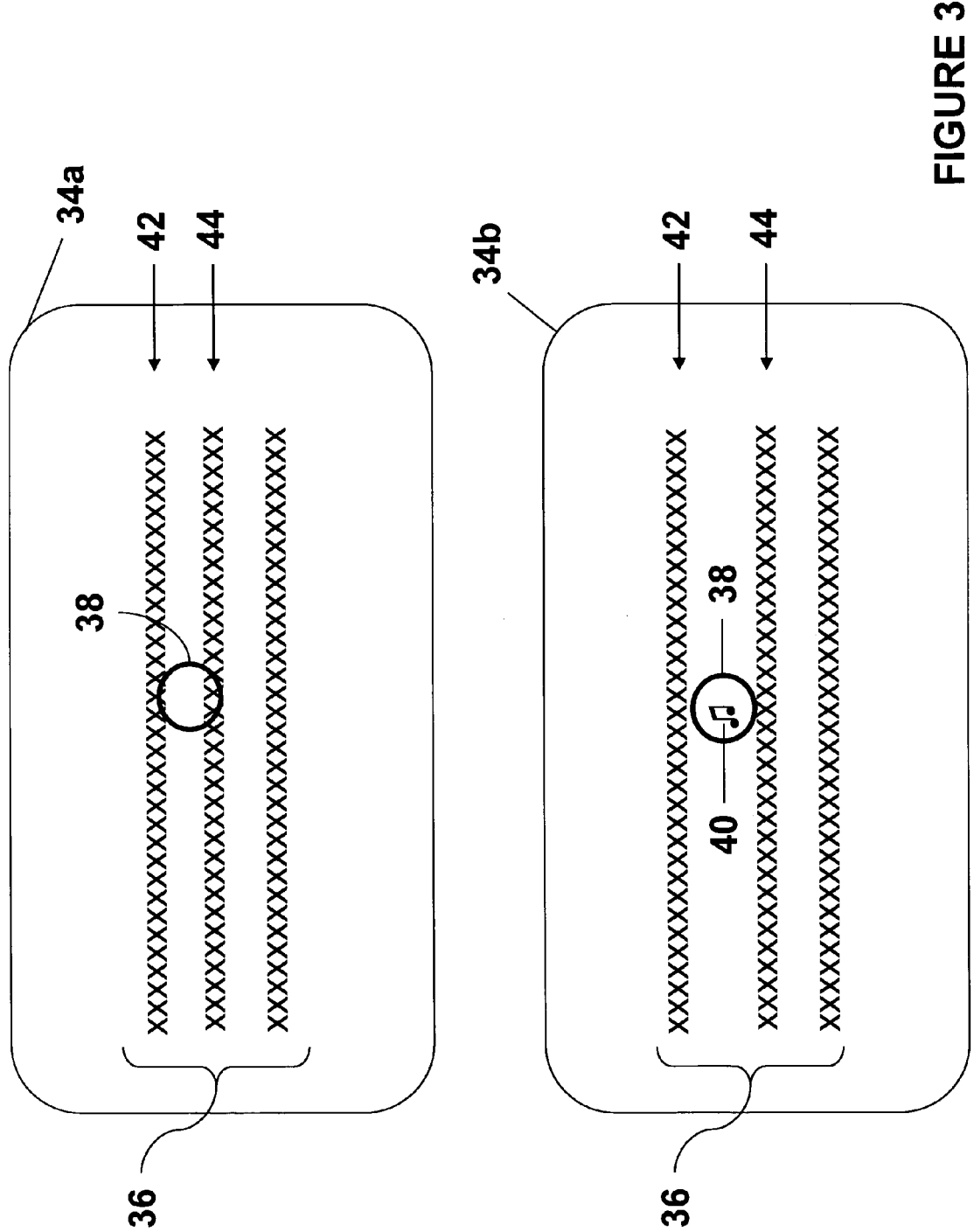
FIG. 3 is an exemplary depiction of rendering a visual element between lines of rendered text.
Figure 4:
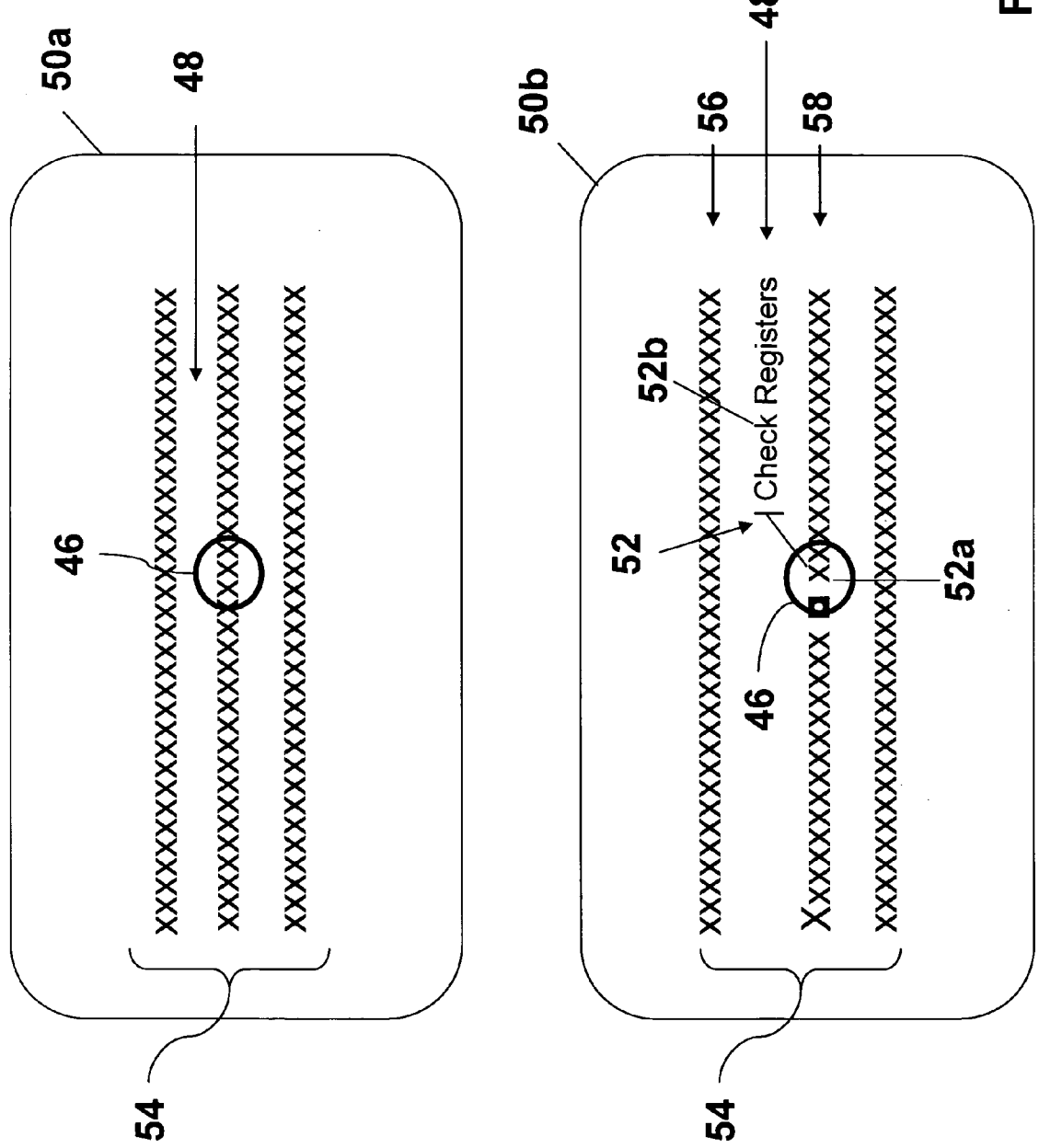
FIG. 4 is an exemplary depiction of rendering a visual element in-line with and between lines of rendered text.

An adornment also can be requested to be rendered in between lines of rendered text. FIG. 3 is an exemplary depiction of rendering a visual element between lines of rendered text. The top portion of FIG. 3 is the "before" display, and the bottom portion of FIG. 3 is the "after" display. The display device 34a in the top portion of FIG. 3 depicts rendered text 36 and a requested location 38 for rendering a requested adornment. The display device 34b in the bottom portion of FIG. 3 depicts the rendering of the requested adornment 40 at the location 38. To accomplish this rendering, space is inserted between the lines of text 42 and 44 to allow rendering of the adornment 40 and the location 38. As much space as needed can be inserted. Thus, the adornment 40 is rendered on the display device 34b without the rendered text 36 being obstructed from view and without the adornment 40 being obstructed from view.

an adornment also can be requested to be rendered in-line with rendered text and between lines of rendered text. FIG. 4 is an exemplary depiction of rendering a visual element in-line with and between lines of rendered text. As in FIG. 2 and FIG. 3, the top portion of FIG. 4 is the "before" display, and the bottom portion of FIG. 4 is the "after" display. The display device 50a in the top portion of FIG. 4 depicts rendered text 54 and requested locations 46 and 48 for rendering a requested adornment. The display device 50b in the bottom portion of FIG. 4 depicts the rendering of the requested adornment 52 at the locations 46 and 48. In this scenario, the requested adornment 52 comprises a glyph 52a to be inserted in-line with rendered text 54 and text 52b to be rendered at location 48, which is between lines 56 and 58 of rendered text 54. To accomplish this rendering, space is inserted in the rendered text 54 at location 46 to allow rendering of the glyph 52a of the adornment 52, and space is inserted between the lines of text 56 and 58 of rendered text 54 to allow rendering of the text 52b of the adornment 52 at the location 48. As much space as needed can be inserted. Thus, the adornment 52 is rendered on the display device 50b without the rendered text 54 being obstructed from view and without the adornment 52 being obstructed from view.

Figure 5:
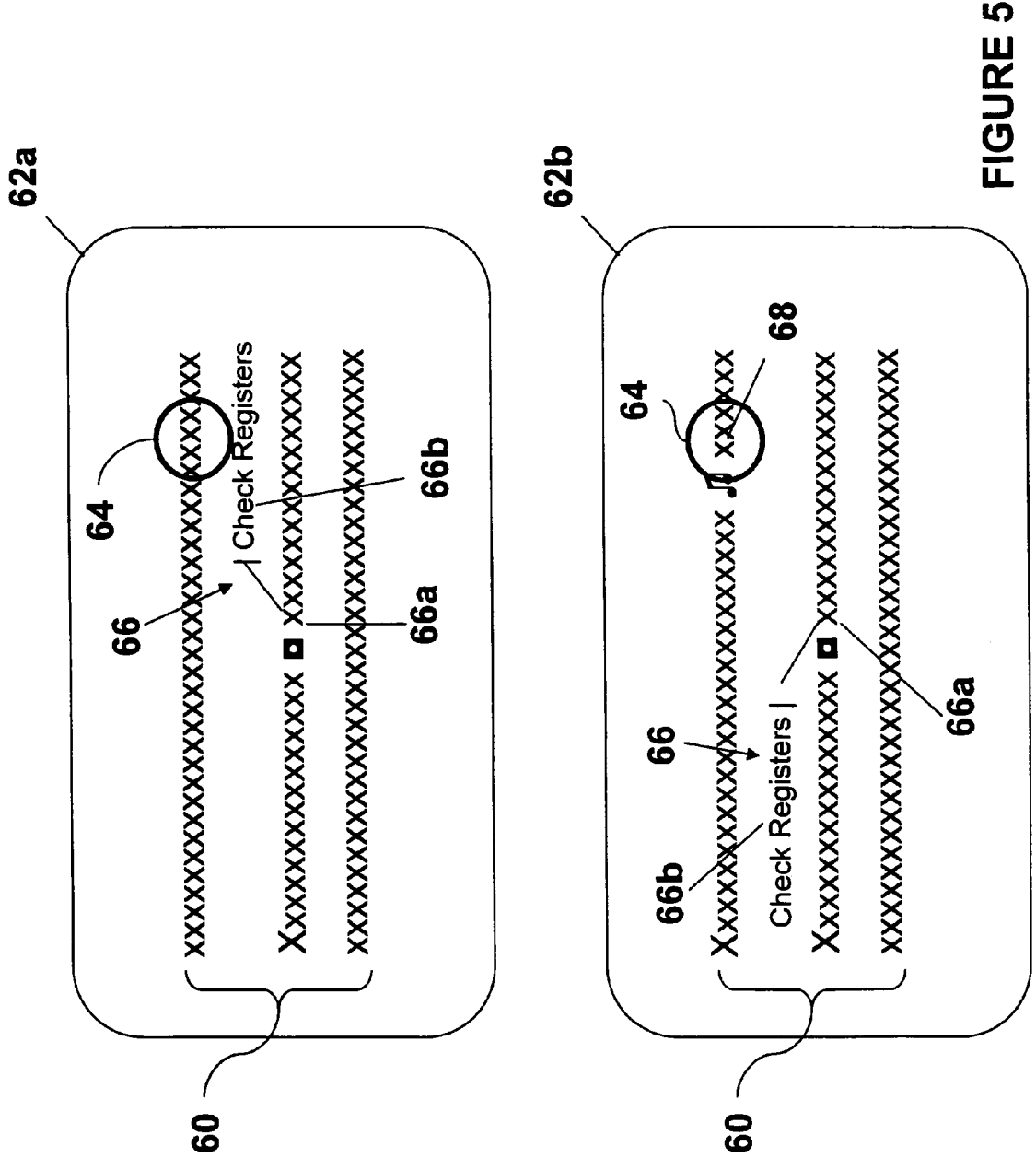
FIG. 5 is an exemplary depiction of rendering a visual element at a location that comprises rendered text and another rendered adornment.

An adornment can be requested to be rendered at a location that is occupied by another adornment. FIG. 5 is an exemplary depiction of rendering a visual element at a location that comprises rendered text and another rendered adornment. Again, the top portion of FIG. 5 is the "before" display, and the bottom portion of FIG. 5 is the "after" display. The display device 62a in the top portion of FIG. 5 depicts rendered text 60 and rendered adornment 66. The rendered adornment 66 comprises a glyph 66a and text 66b. The location at which the requested adornment is to be rendered is labeled a location 64 on the display device 62a. As shown in FIG. 5, simply rendering the requested adornment at location 64 will obstruct the rendered text 60 on display device 62a and will obstruct the text 66b of the adornment 66. In order to render the requested adornment at location 64, space is inserted in the rendered text 60 on the display device 62a and the text 66b of the adornment 66 is moved. The display device 62b in the bottom portion of FIG. 5 depicts the rendering of the requested adornment 68 at the location 64. In this scenario, the requested 68 is inserted in-line with rendered text 60 on display device 62b. The text 66b of the adornment 66 is moved to the left of the glyph 66a of the adornment 66. To accomplish this rendering, it is determined that space is to be inserted in the rendered text 60 at location 64 and that the text 66b of the adornment 66 is to be moved. The reconfiguration of rendered text 60 and the adornment 66 is exemplary. Other reconfigurations can be implemented depending upon user and code editor requirements. The adornment 66 can be reconfigured, for example, to render the text 66b below the glyph 66a, for example. As much space as needed can be inserted. Thus, the adornment 68 is rendered on the display device 62b without the rendered text 60 being obstructed from view, without the requested adornment 68 being obstructed from view, and without the adornment 66 being obstructed from view.

Figure 6:
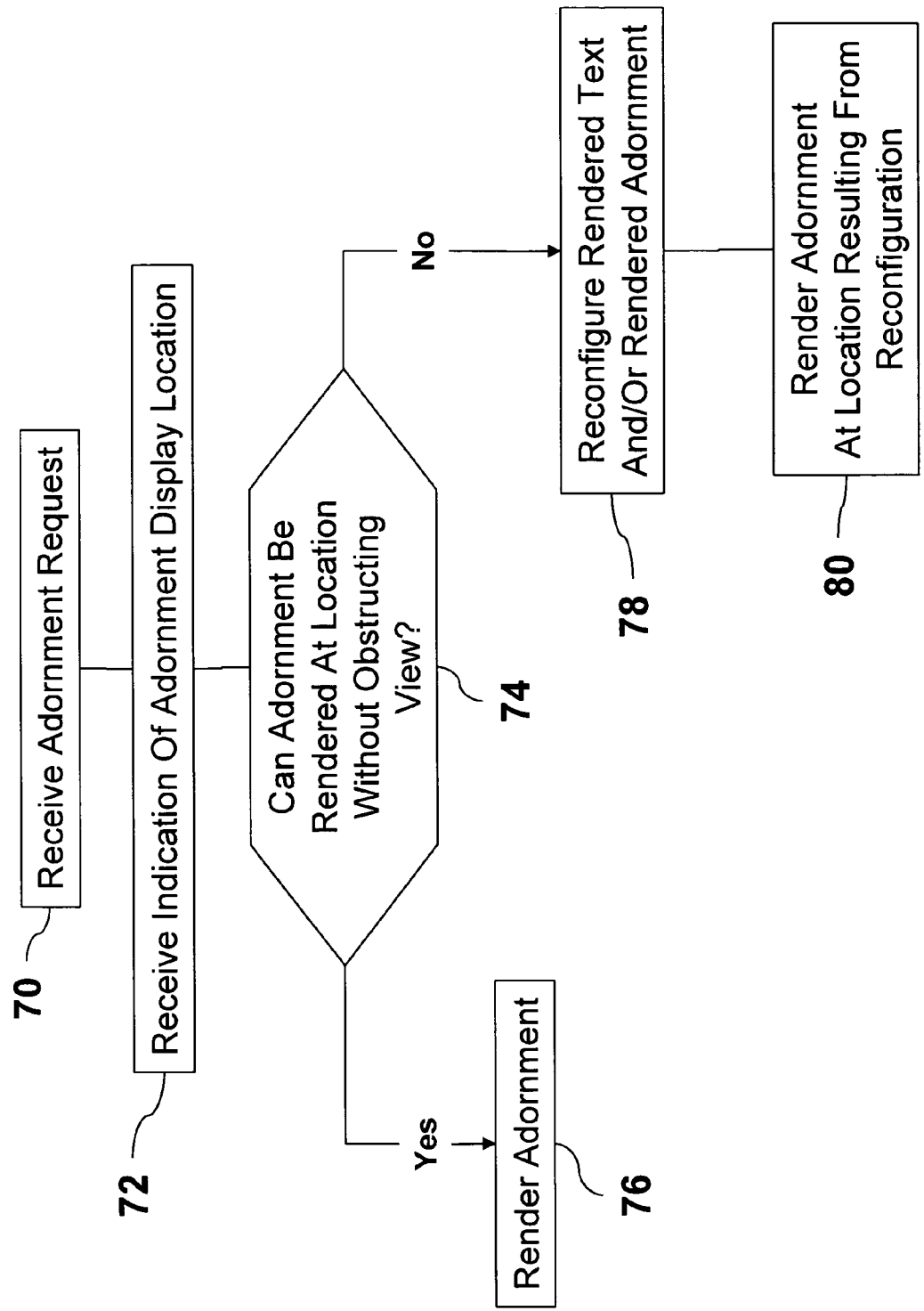
FIG. 6 is a flow diagram of an exemplary process for arbitrarily rendering a visual element in a code editor.

FIG. 6 is a flow diagram of an exemplary process for arbitrarily rendering a visual element in a code editor. A request to render an adornment is received at step 70. This request can be a user request or a request generated by the code editor. This request can come from the user or any part of the system, including, but not limited to, the code editor, debugger, or the like, for example. An indication of the location at which to render the adornment is received at step 72. The location can be any appropriate location on the display device. Appropriate locations include locations that obstruct a view and locations that do not obstruct either the view of rendered text or the view of the adornment. Examples of locations that do not provide view obstruction include locations that allow an adornment to float above, below, and/or beside rendered text. Other appropriate locations include in-line with rendered text and/or between lines of rendered text. Further, an adornment can comprise an appropriate visual element, such as text, an image, a graphic, video, multimedia, or a combination thereof, for example.

At step 74 it is determined if the requested adornment can be rendered at the requested location without obstructing the view of either rendered text, the requested adornment, or any other rendered adornment. If it is determined (step 74) that rendering the adornment at the requested location will not obstruct a view (e.g., floating the adornment above, below, and/or beside rendered text), the adornment is rendered at the requested location at step 76. If it is determined (step 74) that rendering the requested adornment at the requested location will obstruct the view of rendered text, the requested adornment, and/or another rendered adornment, the rendered text and/or rendered adornments are reconfigured at step 78. Reconfiguration can include inserted spaces between text characters in a line of text, inserting spaces between lines of text, moving a rendered adornment, or a combination thereof for example. The requested adornment is rendered at the requested location at step 80 without obstructing a view.

In an exemplary embodiment, adornments are rendered in layers other than a layer in which text is rendered. Utilization of layers allows adornments to be rendered in multiple layers having a specific order. A layer can be turned on or off without affecting other layers. Thus, utilization of layers allows adornments to be turned on (rendered) and off (not rendered). Further, utilization of layers allows adornments to be suppressed when viewing or printing a document.

Figure 7:
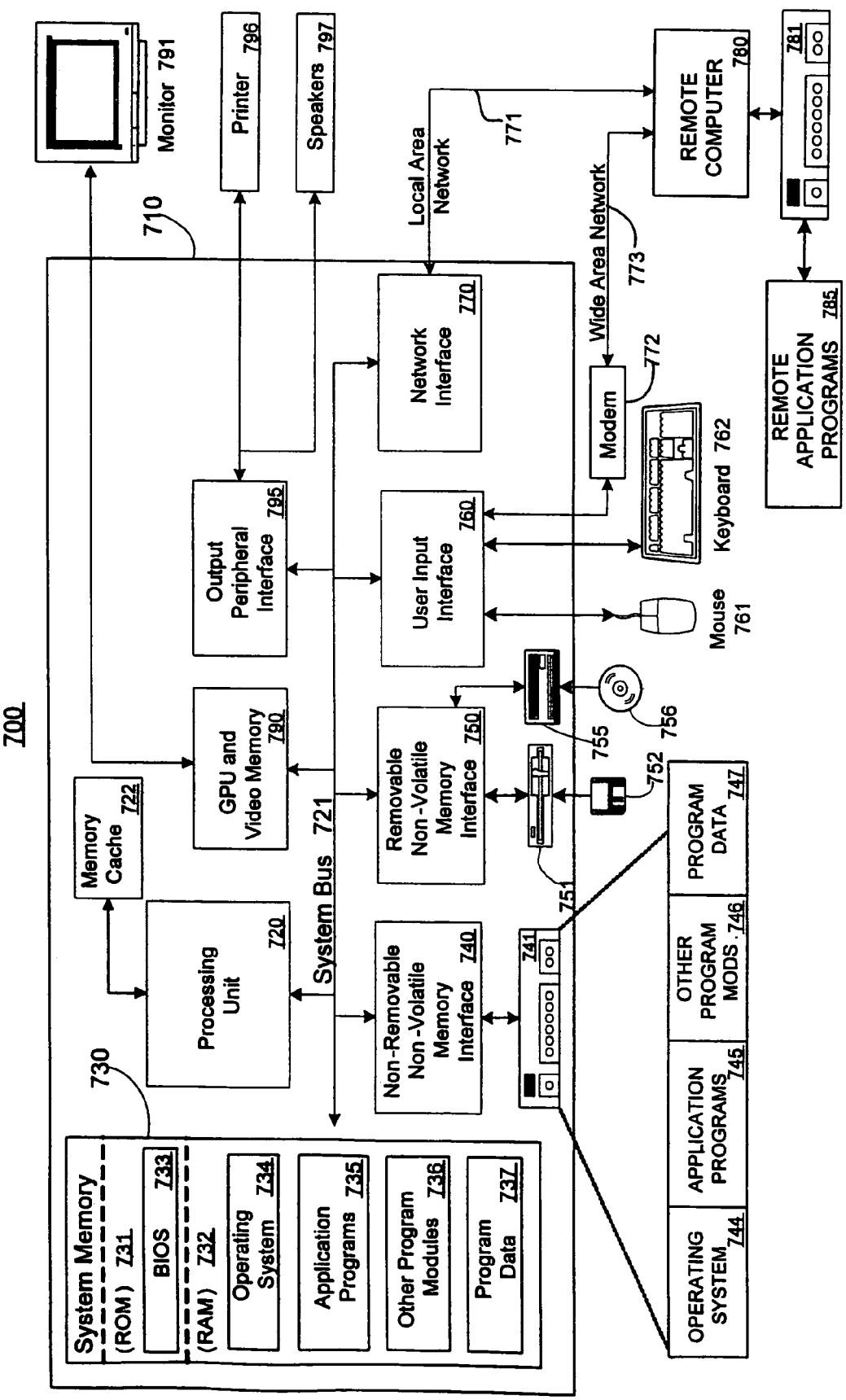
FIG. 7 is an illustration of an exemplary computing system environment for arbitrarily rendering a visual element in a code editor.

While exemplary embodiments of arbitrarily rendering visual elements in a code editor have been described in connection with various computing devices, the underlying concepts can be applied to any computing device or system capable of arbitrarily rendering visual elements in a code editor. FIG. 7 illustrates an example of a suitable computing system environment 700 on visual elements can be arbitrarily rendered in a code editor. The computing system environment 700 is only one example of a suitable computing environment and is not intended to suggest any limitation as to the scope of use or functionality of arbitrarily rendering visual elements in a code editor. Neither should the computing environment 700 be interpreted as having any dependency or requirement relating to any one or combination of components illustrated in the exemplary operating environment 700. Although one embodiment of arbitrarily rendering visual elements in a code editor can include components illustrated in the exemplary operating environment 700, another more typical embodiment of arbitrarily rendering visual elements in a code editor excludes non-essential components.

With reference to FIG. 7, an exemplary system for arbitrarily rendering visual elements in a code editor includes a general purpose computing device in the form of a computer 710. In an exemplary embodiment, the computer 710 is analogous to the computing device 12 of FIG. 1. Components of the computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 710 can include a memory cache 722. The processing unit 720 can access data from the memory cache 722 more quickly than from the system memory 730. The memory cache 722 typically stores the data most recently accessed from the system memory 730 or most recently processed by the processing unit 720. The processing unit 720, prior to retrieving data from the system memory 730, can check if that data is currently stored in the memory cache 722. If so, a "cache hit" results and the data is retrieved from the memory cache 722 rather than from the generally slower system memory 730.

The computer 710 typically includes a variety of computer readable media. Computer readable media can be any available media that can be accessed by the computer 710 and includes both volatile and nonvolatile media, and removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737. In an exemplary embodiment, applications programs 735 comprise a code editor in which visual elements can be arbitrarily rendered.

The computer 710 can also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers hereto illustrate that, at a minimum, they are different copies. Thus, in an exemplary embodiment, application programs 735 can comprise a code editor wherein visual elements can be arbitrarily rendered. A user can enter commands and information into the computer 710 through input devices such as a tablet, or electronic digitizer, a microphone, a keyboard 762, and pointing device 761, commonly referred to as a mouse, trackball or touch pad. Other input devices (not shown) can include a joystick, game pad, satellite dish, scanner, or the like. These and other input devices are often connected to the processing unit 720 through a user input interface 760 that is coupled to the system bus, but can be connected by other interface and bus structures, such as a parallel port, game port or a universal serial bus (USB). A monitor 791 or other type of display device is also connected to the system bus 721 via an interface, such as a video interface 790. In an exemplary embodiment, the monitor 791 is analogous to the display portion 24 in FIG. 1. The monitor 791 can also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 797 and printer 796, which can be connected through an output peripheral interface 795 or the like.

The computer 710 can operate in a networked environment using logical connections to one or more remote computers, such as a remote computer 780. The remote computer 780 can be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but can also include other networks. Such networking environments are commonplace in offices, enterprise-wide computer networks, intranets and the Internet. For example, the computer 710 can comprise the source machine from which data is being migrated, and the remote computer 780 can comprise the destination machine. Note however that source and destination machines need not be connected by a network or any other means, but instead, data can be migrated via any media capable of being written by the source platform and read by the destination platform or platforms.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which can be internal or external, can be connected to the system bus 721 via the user input interface 760 or other appropriate mechanism. In a networked environment, program modules depicted relative to the computer 710, or portions thereof, can be stored in the remote memory storage device. By way of example, and not limitation, FIG. 7 illustrates remote application programs 785 as residing on memory device 781. In an exemplary embodiment, remote application programs 785 comprise a code editor wherein visual elements can be arbitrarily rendered. It will be appreciated that the network connections shown are exemplary and other means of establishing a communications link between the computers may be used.

The various techniques described herein can be implemented in connection with hardware or software or, where appropriate, with a combination of both. Thus, the methods and apparatuses for arbitrarily rendering visual elements in a code editor or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for arbitrarily rendering visual elements in a code editor. In the case of program code execution on programmable computers, the computing device will generally include a processor, a storage medium readable by the processor (including volatile and non-volatile memory and/or storage elements), at least one input device, and at least one output device. The program (s) can be implemented in assembly or machine language, if desired. In any case, the language may be a compiled or interpreted language, and combined with hardware implementations.

By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed in conjunction with developing software utilizing a managed platform registry. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

While methods, apparatuses, and systems for arbitrarily rendering visual elements in a code editor have been described in connection with the illustrative embodiments of the various Figures, it is to be understood that other similar embodiments can be used or modifications and additions can be made to the described embodiment for performing the same function arbitrarily rendering visual elements in a code editor without deviating therefrom. Rather, the specific features and acts described above are disclosed as example forms of implementing the claims. Therefore, methods and apparatuses for arbitrarily rendering visual elements in a code editor should not be limited to any single embodiment, but rather should be construed in breadth and scope in accordance with the appended claims.

What is claimed:

1. A method for rendering visual information in code-related text displayed on a display device upon execution of a source code editor, said method comprising:
   receiving a request to insert an adornment into a screen view of said code-related text displayed on said display device;
   receiving an indication of a location on said display device for rendering said adornment;
   determining at least one of:
      if rendering said adornment at said location on said display device will obstruct viewing of a portion of said code-related text; or
      if rendering said adornment at said location will obstruct viewing of said adornment;
   if rendering said adornment at said location will not obstruct viewing of said portion of code-related text and if rendering said adornment at said location will not obstruct viewing of said adornment, rendering said adornment at said location; and
   if rendering said adornment at said location will obstruct viewing of at least one of said portion of code-related text or said adornment:
      reconfiguring said screen view to provide an unobstructed view of said code-related text and of said adornment, without inserting additional text characters in the form of one or more spaces into a source code from which said code-related text is generated.

2. A method in accordance with claim 1, wherein said adornment comprises at least one of a glyph, a text character, an image, a graphic, multi-media, and video.

3. A method in accordance with claim 1, wherein said location is located inside a line of said code-related text, said method further comprising:
   reconfiguring said screen view to provide space between two text characters of said code-related text at said location; and
   rendering said adornment within said provided space.

4. A method in accordance with claim 1, wherein said location is located between two lines of said code-related text, said method comprising:
   reconfiguring said screen view to provide space between the two lines at said location; and
   rendering said adornment within said provided space.

5. A method in accordance with claim 1, further comprising rendering said adornment in a second display layer that is different than a first display layer in which said code-related text is rendered.

6. A method in accordance with claim 1, wherein said adornment is a breakpoint glyph that is inserted into said code-related text for suspending execution of said source code at the insertion point.

7. A computer-readable storage medium having stored thereon a source code editor comprising computer-executable instructions for:
   providing on a display device, a screen view comprising a rendered text that is derived from a source code by executing said source code editor;
   detecting a request to insert an adornment into said screen view;
   receiving an indication of a location on said display device for rendering said adornment;
   determining at least one of:
      if rendering said adornment at said location on said display device will obstruct a view of said rendered text; or
      if rendering said adornment at said location on said display device will obstruct a view of said adornment;
   if rendering said adornment at said location on said display device will not obstruct a view of said rendered text and if rendering said adornment at said location on said display device will not obstruct a view of said adornment, rendering said adornment at said location on said display device; and
   if rendering said adornment at said location on said display device will obstruct a view of at least one of said rendered text or said adornment:
      reconfiguring said screen view to provide an unobstructed view of said rendered text and of said adornment, without inserting an additional space character into said source code from which said rendered text is derived.

8. A computer-readable storage medium in accordance with claim 7, wherein said adornment comprises at least one of a glyph, a text character, an image, a graphic, multi-media, and video.

9. A computer-readable storage medium in accordance with claim 7, wherein said location is located in a line of said rendered text, said computer-readable storage medium having further computer-executable instructions for:
   reconfiguring said screen view to provide space between two rendered text characters at said location; and
   rendering said adornment within said provided space.

10. A computer-readable storage medium in accordance with claim 7, wherein said location is located between two lines of said rendered text, said computer-readable storage medium having further computer-executable instructions for:
    reconfiguring said screen view to provide space between the two lines of said rendered text at said location; and
    rendering said adornment within said provided space.

11. A computer-readable storage medium in accordance with claim 7, said computer-readable storage medium having further computer-executable instructions for rendering said adornment within a first display layer that is different than a second display layer in which said rendered text is located.

12. A computer-readable storage medium in accordance with claim 7, wherein said adornment is a breakpoint glyph to indicate a spot in said source code where a breakpoint is desired.

13. A computer-readable storage medium in accordance with claim 7, wherein said request to insert said adornment is originated by a debugger.

14. A computer-readable storage medium in accordance with claim 7, wherein said request to insert said adornment is a user-originated request.

15. A computer-readable storage medium in accordance with claim 7, wherein said rendered text is used for viewing and editing said source code.

16. A computing device for rendering visual information in a rendered text, said computing device comprising:
- a display portion for displaying a screen view containing said rendered text derived from a source code by running a code editor;
- a memory portion for storing a) said source code, and b) an adornment, said adornment comprising a glyph and an associated text string associated with said glyph; and
- a processor portion for running said code editor and displaying thereon said screen view containing said rendered text on said display portion, wherein running said code editor comprises:
  - responding to a request to visually render said adornment on said display portion, by obtaining said adornment from said memory portion;
  - responding to receiving an indication of a location on said display portion for rendering said adornment, by determining at least one of:
    - if rendering said adornment at said location on said display portion will obstruct a view of said rendered text; or
    - if rendering said adornment at said location on said display portion will obstruct a view of said adornment;
    - if rendering said adornment at said location on said display portion will not obstruct a view of said rendered text and said adornment, rendering said adornment at said location on said display portion; and
    - if rendering said adornment at said location on said display portion will obstruct a view of at least one of said rendered text or said adornment:
      - reconfiguring said screen view to provide an unobstructed view of said rendered text and of said adornment by a) inserting said glyph between two displayed characters of a first line of said rendered text, and b) by inserting said associated text string at an intermediate location between said first line and an adjacent line of said rendered text.

17. A computing device in accordance with claim 16, wherein said memory portion is further used for storing an adornment, and wherein running said code editor further comprises:
- reconfiguring said screen view to provide an unobstructed view of said rendered text and of said additional adornment by repositioning said associated text string from said intermediate location between said first line and said adjacent line to an alternative location.

18. A computing device in accordance with claim 17, wherein said alternative location is located between said first line and said adjacent line.

19. A computing device in accordance with claim 16, wherein reconfiguring said screen view by inserting said glyph and said associated text string into said rendered text does not result in the addition of at least one of a space character or a text character into said source code.

20. A computing device in accordance with claim 16, wherein said glyph is a breakpoint glyph to indicate a spot in said source code where a breakpoint is desired.

* * * * *